J. MORASKY.
METAL TIRE PROTECTOR.
APPLICATION FILED MAR. 26, 1912.

1,049,899.

Patented Jan. 7, 1913.

2 SHEETS—SHEET 1.

WITNESSES
Robert M. Sutphen
Jw. McCathan

INVENTOR
Joseph Morasky
By E. E. Vrooman, his Attorney.

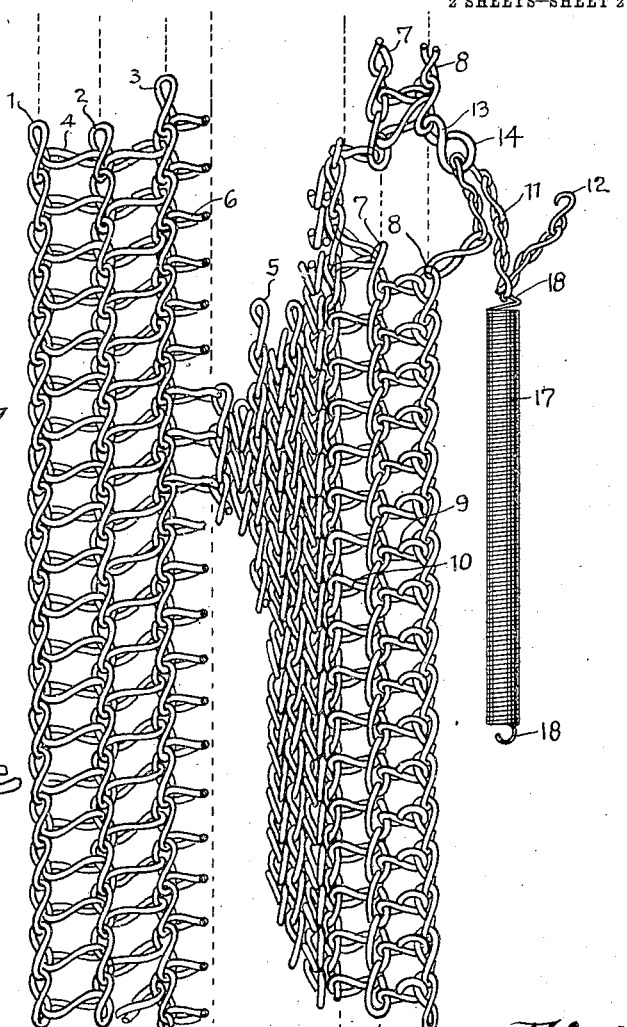
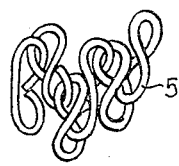
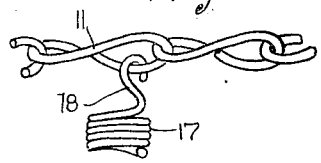
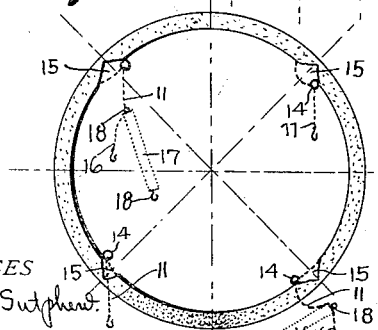
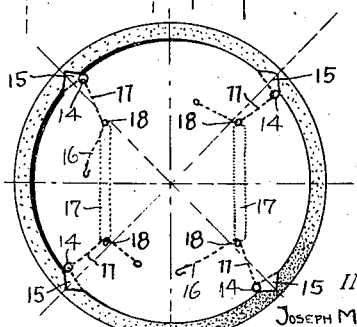

UNITED STATES PATENT OFFICE.

JOSEPH MORASKY, OF FORBES, COLORADO.

METAL TIRE-PROTECTOR.

1,049,899.  Specification of Letters Patent.  Patented Jan. 7, 1913.

Application filed March 26, 1912. Serial No. 686,280.

*To all whom it may concern:*

Be it known that I, JOSEPH MORASKY, a citizen of the United States, residing at Forbes, in the county of Las Animas and State of Colorado, have invented certain new and useful Improvements in Metal Tire-Protectors, of which the following is a specification, reference being had therein to the accompanying drawing.

This invention relates to tire protectors of a metallic chain type, and has for its object the production of an efficient protector which may be readily attached to and detached from a tire.

Another object of this invention is the production of an efficient protector, one side of which is so split as to allow the protector to be adjustably connected to a tire, in such a manner as to entirely encircle the tread of the same.

Still another object of this invention is the production of an efficient means for holding the tire protector upon the wheel and tire.

With these and other objects in view this invention consists of certain novel constructions, combinations, and arrangements of parts as will be hereinafter fully described and claimed.

Figure 1:
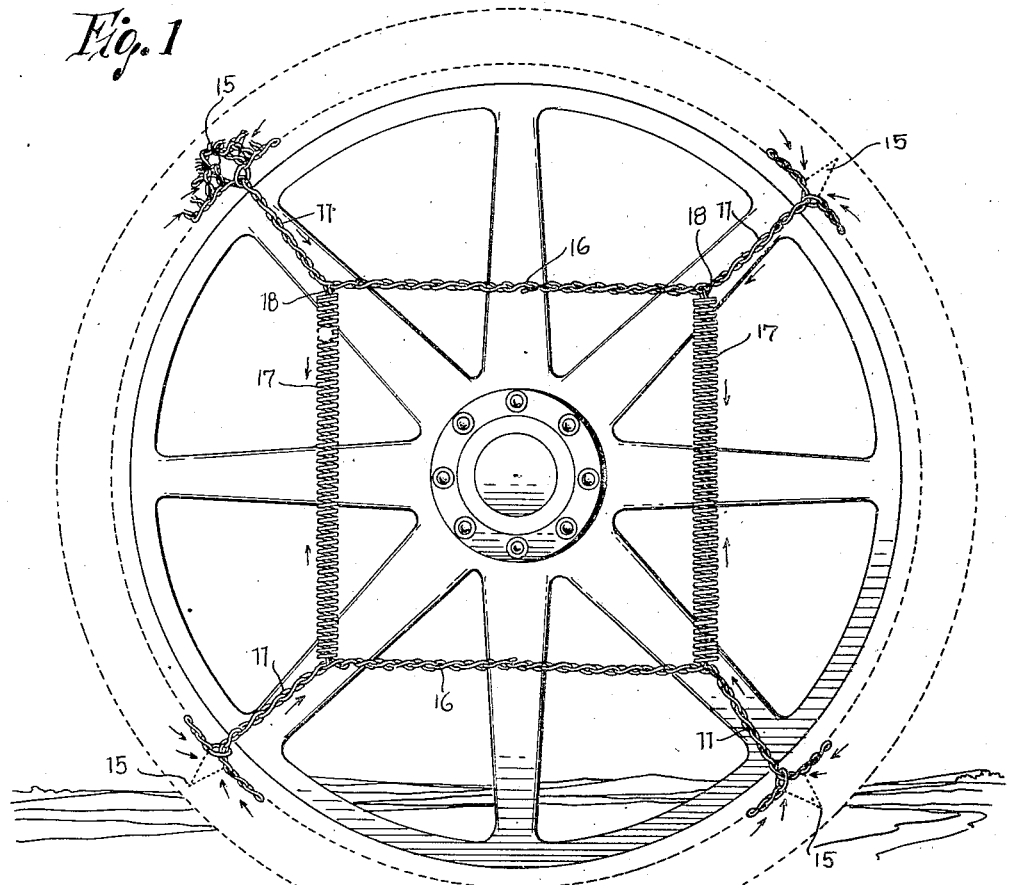
Figure 2:

In the drawings:—Figure 1 is a side elevation partly in diagram of a wheel showing the protector attached thereto. Fig. 2 is a transverse sectional view through a tire showing the position which the protector takes upon the tire. Fig. 3 is a plan view of the tread protector showing the manner of weaving and connecting the links. Fig. 4 is a plan view of one series of links forming the tread of the tire protector. Fig. 5 is an enlarged view showing the manner of attaching the springs to the retaining chains of the tire protector. Fig. 6 is a diagrammatic view of the protector as placed upon the tire, and before the connecting springs and chains are secured together. Fig. 7 is a diagrammatic view similar to Fig. 6, showing the springs connected to the chains, and the chains disconnected, said chains being ready to be connected in such a manner as shown in Fig. 1.

By referring to the drawings it will be seen that the protector consists of a link chain body, which is adapted to fit snugly around the outer portion of the tire and be drawn closely around the side edges thereof for forming a firm gripping means for the protector upon the tire.

As indicated in Fig. 3 and also shown in an enlarged view in Fig. 4, the protector comprises a side section consisting of three rows 1, 2 and 3 of longitudinally extending links, each of these rows being connected by means of transversely extending links 4. Each of the links in the longitudinally extending rows 1, 2 and 3 are connected to the link running parallel thereto of the next row by means of a transversely extending link, as illustrated clearly in Fig. 3. The longitudinally extending row 3 of the tire protector is connected to the thickly woven tread portion 5 by means of transversely extending links 6.

The thickly woven tread portion 5 of the protector comprises a series of longitudinally extending links, the links of one longitudinally extending row interlocking with the links of the next adjoining longitudinally extending row. By having the links of one row interlocking with the links of the next adjoining row, it will be seen that a practically solid body will be produced upon the center of the tire protector and owing to the compact relation of the links, when being so connected, a comparatively thickened tread portion will be produced. This thickened tread portion will, of course, be so formed as to extend a little higher than the side links composing rows 1, 2 and 3. Upon the opposite side of the thickly woven tread portion of the protector, a pair of longitudinally extending rows of links 7 and 8 are provided which rows are connected by means of a series of transversely extending links 9. The longitudinally extending row 7 of the links is connected to the thickly woven portion of the chain or tread, by means of a series of transversely extending links 10. The rows 7 and 8 of the chains upon the side of the protector are divided into four sections so as to facilitate the placing of the protector upon the tire. The outer end of the row 8 of the links is connected to a retaining chain 11, which chain carries a locking hook 12 at its outer end. An enlarged eye link 13 is carried by the outer row 8 of the next adjoining section of the chains 7 and 8, and the chain 11 passes through the eye 14 of the link 13, and by drawing the chain it will be seen that the end of the adjacent sections may be drawn closely together thereby allowing the protector to firmly fit upon the tire and conform to the contour thereof. It will be seen that this substantially V-shaped opening or space between each of the adjoining sections of the protector just described will form a means whereby the protector may be placed upon and detached from the tire for by releasing the chain 11 and allowing the same to slide through the eye 14 of the link 13 the ends of the adjoining sections may be spread apart a sufficient distance to allow the tire protector to be moved laterally from the tire itself. The central closely woven tread portion of the tire protector is so woven as to extend above the inner end of the arch notch 15 formed between the sections of the side of the tire protector so that when the sides of the sections are released, the same may be removed from the tire easily for the reason that the inner end of the arch notch will be in alinement with the lower or inner edges of the links forming the closely woven tread portion of the protector thereby allowing the tire protector to be removed from the tire without deflating the same.

When attaching the protector to the tire or wheel, the ends of the chains of two of the side sections are hooked together by means of the hooks 16, and in this way will form a pair of parallel chain portions as illustrated in Fig. 1. These parallel chains are then connected by means of coil springs 17 which have their hooked ends 18 engaging some of the links of the parallel chains 16. It will, therefore, be seen that the tire protector will be yieldably held upon the wheel, and that this protector may be readily and quickly attached and detached to or from the wheel. In view of the fact that the chain 11 is so passed through the eye 14, it will be seen that as pressure is brought to bear upon the chain the adjacent ends of the section of the side of the protector will be brought closely together and thereby firmly holding the tire protector upon the tire and wheel.

What is claimed is:—

1. A protector of the class described comprising a central closely woven tread portion, a side portion formed of a series of longitudinally extending chains spaced from each other, spaced links connecting said chains together and to said closely woven tread portion, one of said sides divided in a plurality of sections, a protector-retaining-chain secured to one end of each section, an eye secured to the opposite end of each section, the retaining chain of one section passing through the eye of the other section for firmly drawing said sections together, the retaining chains of two of said sections interlocking for constituting a pair of continuous parallel retaining chains, and a spring connecting said parallel retaining chains.

2. A protector of the class described comprising a tread portion, a side portion formed upon each side of said tread, one of said sides divided into a plurality of sections, a retaining member engaging one end of each section, an eye secured to the opposite end of each section, said retaining member passing through said eye, and means engaging said retaining members for connecting the same together whereby said sections of said side portions will be firmly clamped around the tire for holding the protector thereon.

In testimony whereof I hereunto affix my signature in presence of two witnesses.

JOSEPH MORASKY.

Witnesses:
  F. R. Wood,
  H. H. Sanderson.